(12) United States Patent
Asterbadi

(10) Patent No.: US 9,454,579 B2
(45) Date of Patent: Sep. 27, 2016

(54) METHOD, SYSTEM AND APPARATUS FOR MANAGING CONTACT DATA

(76) Inventor: Dalia N. Asterbadi, Toronto (CA)

(*) Notice: Subject to any disclaimer, the term of this patent is extended or adjusted under 35 U.S.C. 154(b) by 294 days.

(21) Appl. No.: 12/914,285

(22) Filed: Oct. 28, 2010

(65) Prior Publication Data

US 2012/0109996 A1    May 3, 2012

(51) Int. Cl.
*G06F 17/30* (2006.01)
*G06Q 10/10* (2012.01)

(52) U.S. Cl.
CPC ......... *G06F 17/30525* (2013.01); *G06Q 10/10* (2013.01)

(58) Field of Classification Search
CPC ................................................ G06F 17/30312
USPC ........................................................ 707/769
See application file for complete search history.

(56) References Cited

U.S. PATENT DOCUMENTS

| | | | |
|---|---|---|---|
| 7,716,198 B2* | 5/2010 | Meyerzon et al. | 707/706 |
| 2003/0120654 A1* | 6/2003 | Edlund et al. | 707/7 |
| 2005/0060325 A1* | 3/2005 | Bakalash et al. | 707/100 |
| 2005/0091272 A1 | 4/2005 | Smith et al. | |
| 2005/0182745 A1* | 8/2005 | Dhillon | G06Q 10/10 |
| 2006/0206475 A1* | 9/2006 | Naam et al. | 707/5 |
| 2007/0136245 A1* | 6/2007 | Hess et al. | 707/3 |
| 2007/0143364 A1 | 6/2007 | Chen et al. | |
| 2007/0299815 A1* | 12/2007 | Starbuck | G06F 17/30648 |
| 2008/0205655 A1* | 8/2008 | Wilkins et al. | 380/279 |
| 2009/0292814 A1 | 11/2009 | Ting et al. | |
| 2010/0100952 A1 | 4/2010 | Sample et al. | |
| 2010/0153968 A1* | 6/2010 | Engel | 719/313 |
| 2010/0241611 A1 | 9/2010 | Zuber et al. | |
| 2011/0260964 A1* | 10/2011 | Mujkic | 345/156 |
| 2011/0307455 A1 | 12/2011 | Gupta et al. | |
| 2014/0372330 A1* | 12/2014 | Shang | G06F 17/30684 705/319 |

FOREIGN PATENT DOCUMENTS

| | | | |
|---|---|---|---|
| WO | 2007005607 A2 | 1/2007 | |
| WO | 2012000169 A1 | 1/2012 | |

OTHER PUBLICATIONS

WIPO, International Search Report and Written Opinion for PCT Application No. PCT/CA2011/001181 dated Feb. 15, 2012.

* cited by examiner

*Primary Examiner* — William Spieler
(74) *Attorney, Agent, or Firm* — Norton Rose Fulbright Canada LLP; Niall Cooney

(57) ABSTRACT

According to embodiments described in the specification, a method, system and apparatus for managing contact data are provided. The method comprises storing a plurality of contact attributes distilled from at least one data source in a memory, the contact attributes defining a plurality of contacts; receiving input data at a communications interface; identifying at least one search attribute from the received input data; selecting at least one of the plurality of contacts based on matches between the plurality of contact attributes and the at least one search attribute; and transmitting notification data based on the selected contact.

13 Claims, 6 Drawing Sheets

METHOD, SYSTEM AND APPARATUS FOR MANAGING CONTACT DATA

FIELD

The specification relates generally to data management, and specifically to a method, system and apparatus for managing and augmenting contact data based on chronological, contextual, semantic, and other attributes.

BACKGROUND

Modern travel and communications technology have led to an increasingly interconnected global population. As a result, any given individual may have contact with a significant number of others in various locations and for various reasons. Tracking and determining the relative relevance of an ever-increasing number of such contacts, as well as the increasing volume of data available in connection with each contact, presents various technical challenges.

BRIEF DESCRIPTIONS OF THE DRAWINGS

Embodiments are described with reference to the following figures, in which.

DETAILED DESCRIPTION OF THE EMBODIMENTS

According to an aspect of the specification, a method of managing contact data is provided, the method comprising: storing a plurality of contact attributes distilled from at least one data source in a memory, the contact attributes defining a plurality of contacts; receiving input data at a communications interface; identifying at least one search attribute from the received input data; selecting at least one of the plurality of contacts based on matches between the plurality of contact attributes and the at least one search attribute; and transmitting notification data based on the selected contact.

According to another aspect of the specification, a server is provided comprising a memory, a communications interface and a processor configured to perform the method.

According to a further aspect of the specification, a non-transitory computer-readable medium is provided for storing computer-readable instructions executable by a processor, the computer-readable instructions implementing the method.

Figure 1:
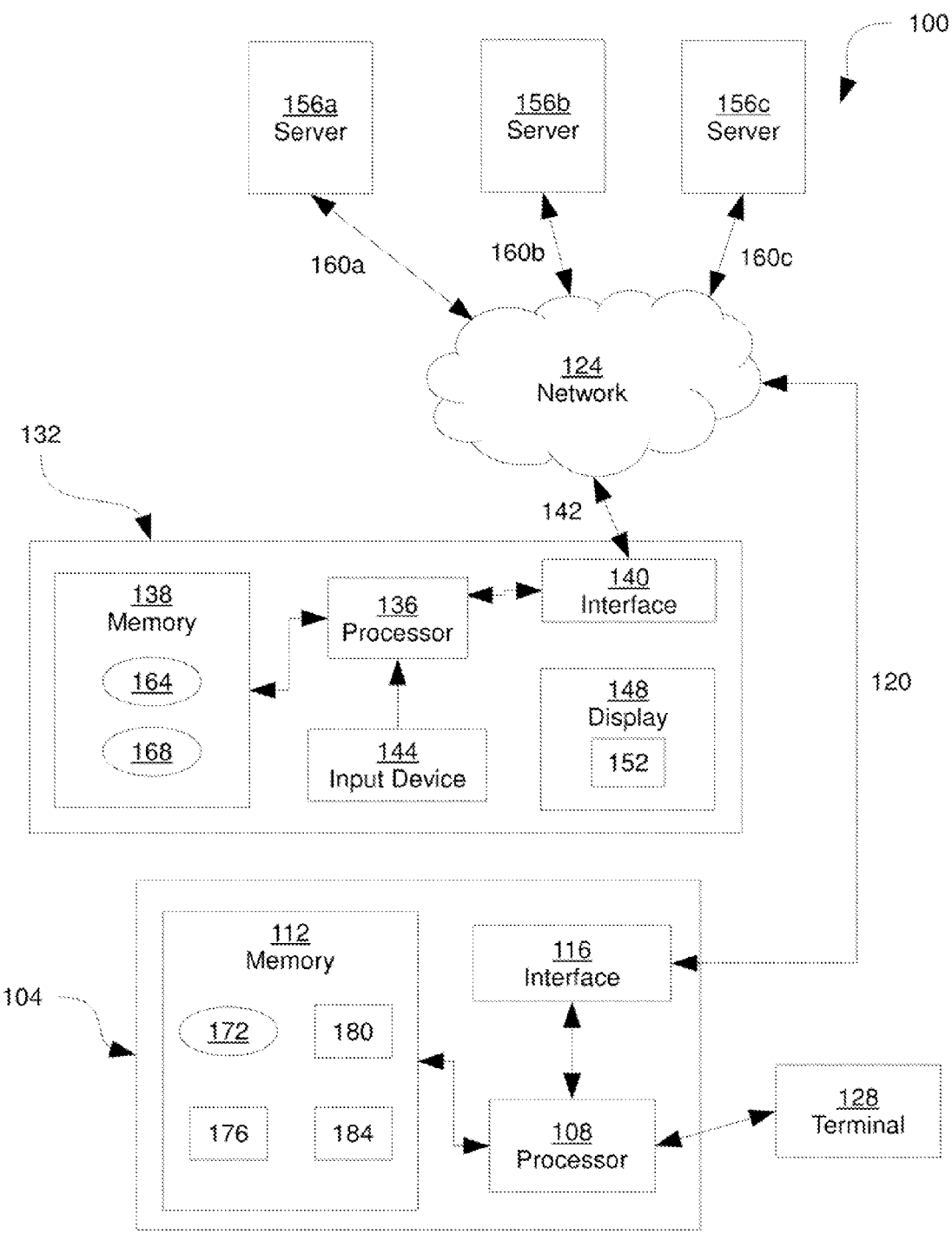
FIG. 1 depicts a system for managing contact data, according to a non-limiting embodiment.

FIG. 1 depicts a system 100 for managing and augmenting contact data. System 100 includes a computing device 104, which in the present embodiment is based on the computing environment and functionality of a server. In some embodiments, computing device 104 can also comprise a plurality of servers, which can be located in one or more facilities at any suitable geographic locations. Computing device 104 includes a processor 108 interconnected with a non-transitory computer readable storage medium such as a memory 112. Memory 112, as will be appreciated by those skilled in the art, can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Computing device 104 also includes a communications interface 116 interconnected with processor 108. Communications interface 116 allows computing device 104 to communicate with other computing devices via a link 120 and a network 124. Network 124 can include any suitable combination of wired and/or wireless networks, including but not limited to a Wide Area Network ("WAN") such as the Internet, a Local Area Network ("LAN"), cell phone networks, WiFi networks, WiMax networks and the like. Link 120 is compatible with network 124. In some embodiments, link 120 is a wired link. It will be understood that communications interface 116 can therefore be selected for compatibility with link 120 as well, as with network 124.

Computing device 104 can be managed by way of a terminal 128 including at least a display and one or more input devices such as a mouse and keyboard. Terminal 128 can be co-located with computing device 104, in which case the display and input devices can be in direct communication with processor 108. In other embodiments, terminal 128 can include a personal computer and be located remotely from computing device 104. In such embodiments, terminal 128 communicates with computing device 104 via network 124.

The various components of computing device 104 are interconnected, for example via a communication bus (not shown). Computing device 104 can be powered by mains electricity or a battery (not shown), or a combination thereof.

System 100 also includes at least one client device 132, which in the present embodiment is based on the computing environment and functionality of a personal computer. It will be understood, however, that client device 132 is not limited to a personal computer. Other computing devices are also contemplated, such as cellular telephones, smart telephones, Personal Digital Assistants ("PDAs"), media or MP3 players, laptop computers and the like.

Client device 132 thus includes a processor 136 interconnected with a non-transitory computer readable storage medium such as a memory 138. Memory 138, as will be appreciated by those skilled in the art, can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Client device 132 also includes a communications interface 140 interconnected with processor 136. Communications interface 140 allows client device 132 to communicate with other devices, such as computing device 104, via a link 142 and network 124. Link 142 is compatible with network 124. In some embodiments, link 142 is a wired link. In other embodiments, link 142 can be a wireless link based on Global System for Mobile communications ("GSM"), General Packet Radio Service ("GPRS"), Enhanced Data rates for GSM Evolution ("EDGE"), and the third-generation mobile communication system (3G), Institute of Electrical and Electronic Engineers ("IEEE") 802.11 (WiFi) or other wireless protocols. It will be understood that when link 142 is wireless, link 142 can also include any base stations and backhaul links necessary to connect client device 132 to network 124. It will be understood that communications interface 140 can therefore be selected for compatibility with link 142 as well as with network 124.

Client device 132 also includes an input device 144 interconnected with processor 136. In general, input device 144 is configured to receive input (such as key presses) and provide input data representative of that input to processor 136. Input device 144 can thus include any suitable combination of a mouse, a keyboard, a microphone, a touch screen and the like. In embodiments where input device 144 includes a touch screen, the touch screen can be integrated with a display 148, described below in further detail.

Client device 132 further includes one or more output devices, such as display 148. Other output devices are also contemplated, such as speakers (not shown) and the like. Display 148 includes display circuitry 152 controllable by processor 136 for generating representations of data and/or applications maintained in memory 138. It will now be apparent that display 148 can include a flat panel display (e.g. Liquid Crystal Display (LCD), plasma, and the like), a Cathode Ray Tube (CRT), and the like. Circuitry 152 can thus include any suitable combination of display buffers, transistors, electron beam controllers, LCD cells, plasma cells, phosphors, and the like.

The various components of client device 132 are interconnected, for example via a communication bus (not shown). Client device 132 can be powered by mains electricity or a battery (not shown), or a combination thereof.

System 100 also includes a plurality of servers 156a, 156b, 156c and so on (referred to collectively as servers 156 and generically as a server 156). Each server 156 can be based on any known server environment. As such, each server 156 includes one or more processors, volatile (e.g. Random Access Memory ("RAM")) and/or non-volatile (e.g. read only memory ("ROM"), Electrically Erasable Programmable Read Only Memory ("EEPROM"), flash memory, magnetic computer storage device, or optical disc) memories and one or more communications interfaces for interconnecting with network 124 via links 160. Links 160 can be, for example, wired links. Servers 156 can be managed by way of input and output devices (not shown) such as keyboards and displays. Such input and output devices can be co-located with servers 156 or can be located at terminals (not shown) remote from servers 156 and connected to servers 156 via network 124.

As will be discussed in greater detail below, each server 156 can be a remote source of contact data for computing device 104. For example, server 156a can be a server hosting a social networking application such as Twitter™, Facebook™ or Linkedin™. Those skilled in the art will recognize that the noted social networking sites are merely indicative of a growing number of social network sites (many of which are segmented by interest and location)—a non-exhaustive list of which are maintained by Wikipedia at the URL http://en.wikipedia.org/wiki/List_of_social_networking_websites. By way of further example, server 156b can be a server hosting webmail services such as Gmail™, or Yahoo! Mail or Hotmail™ as well as server based mail services such as Microsoft Outlook which allow users to maintain address books. Server 156c can include messaging or communication services including instant messaging services such as Windows Live Messenger, Yahoo! Messenger or Google Talk—as well as communication services such as Skype or Google Voice. A wide variety of other remote sources of contact data will occur to those skilled in the art.

In general, computing device 104 and client device 132 can interact with servers 156 and obtain data from servers 156 via network 124 and the relevant ones of links 120, 142, 160a, 160b and 160c. Client device 132 can interact with servers 156, for example, through a web browser interface provided by a browser application maintained by client device 132. Computing device 104 can interact with servers 156 via Application Programming Interface (API) calls transmitted by computing device 104.

As will be discussed in further detail below, client device 132 can maintain, in memory 138, a plurality of applications each comprising computer-readable instructions executable by processor 136. Such applications can include a web browser application 164 and a contact agent client application 168 (also referred to herein as "contact agent client 168" and "client application 168").

Computing device 104 can also maintain, in memory 112, a plurality of applications each comprising computer-readable instructions executable by processor 108. Among those applications can be a contact agent host application 172 (also referred to herein as "contact agent host 172" and "host application 172"). In general, computing device 104 can be configured, via execution of contact agent host 172 by processor 108, to aggregate contact data from various sources, including one or more of servers 156 as well as client device 132, to analyze the aggregated data and store the resulting analyzed data, and to perform actions based on the analyzed data. The term "contact data" is used herein in a broad sense, to indicate data relating to contacts (i.e. individuals or other legal entities such as corporations). Contact data can thus include any data which describes such contacts, is published by or in connection with contacts, relates to messages and events in which contacts are involved, results from the activities of contacts (e.g. the execution of applications by contacts), and the like. The analyzed data can include attributes defining contact records (i.e. name and address information for contacts) and other attributes associated with the contact records. Such attributes will be discussed in greater detail below, and can include, for example, chronological, contextual, and semantic attributes.

Figure 2:
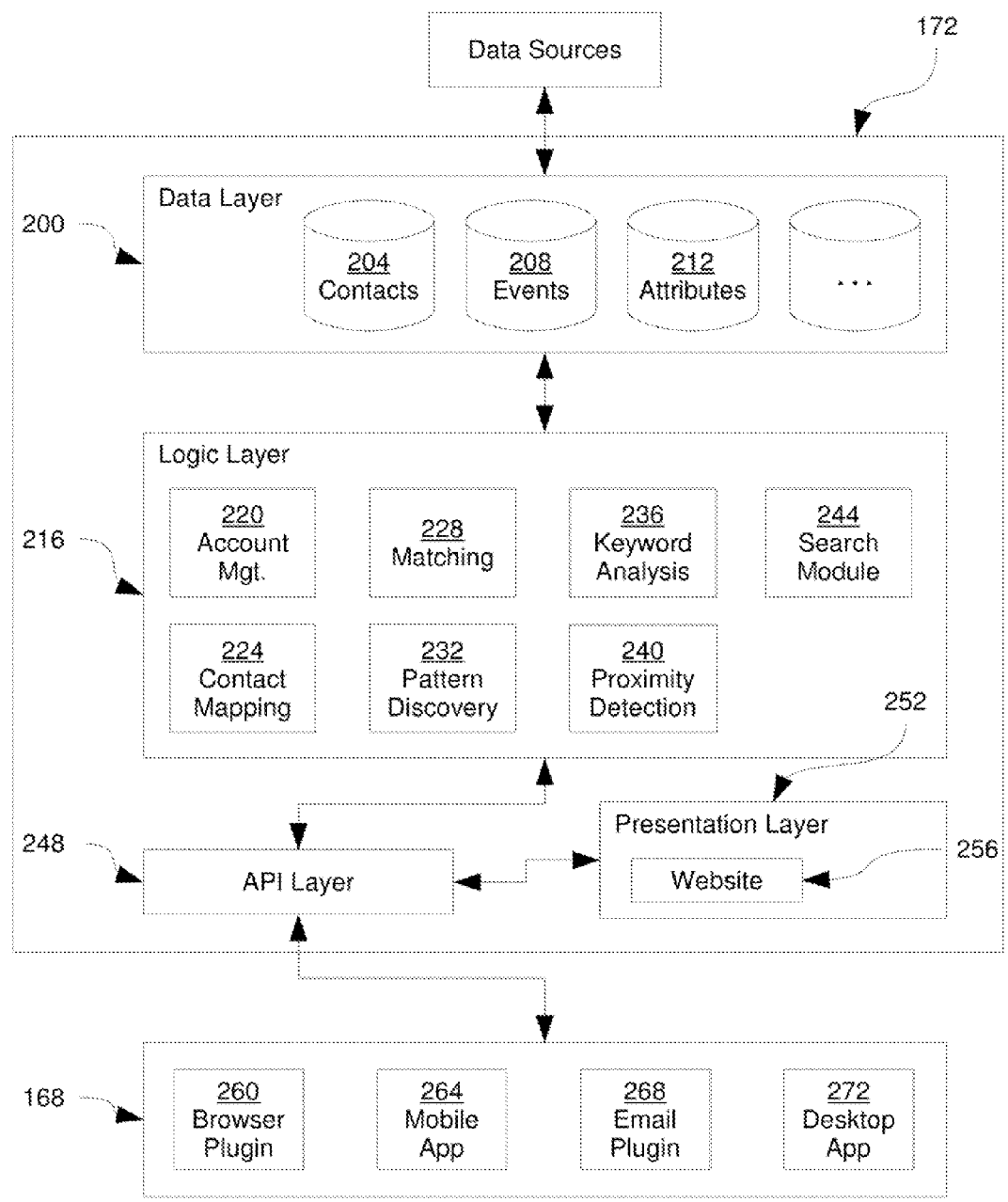
FIG. 2 depicts a contact agent of the system of FIG. 1, according to a non-limiting embodiment.

Referring now to FIG. 2, a schematic block diagram of certain components of contact agent host 172 is depicted. It will now be apparent that each element of contact agent host 172 depicted in FIG. 2 and discussed below can be embodied within the computer-readable instructions that comprise contact agent host 172. In other words, functionality described below as being carried out by a certain module of contact agent host 172 is performed by processor 108, as configured via the execution of contact agent host 172. Contact agent host 172 can thus include a data layer 200 responsible for interactions with data sources (such as servers 156). Data layer 200 also manages the storage of contact data and analyzed data. Examples of analyzed data are shown in the form of contacts 204, events 208 and attributes 212. It will be appreciated that while contacts 204 and attributes 212 both contain attributes as discussed earlier, contacts 204 can contain those attributes which define contact records, such as names and address information for various entities. Analyzed data can also include messages (not shown) retrieved from contact data. Such messages can include text, video, voice messages and the like, or any suitable combination thereof. It will now be apparent that although contacts 204, events 208 and attributes 212 are shown as being maintained separately, any suitable storage and indexing scheme can be used to maintain analyzed contact data.

Contact agent host 172 can also include a logic layer 216. Logic layer 216 can include an account management module 220, a contact mapping module 224, a matching module 228, a pattern discovery module 232, a keyword analysis module 236, a proximity detection module 240 and a search module 244. The functions of the various exemplary modules of logic layer 216 will be discussed below in greater detail.

The account management module 220 manages data in memory 112 associated with each source of contact data. The data maintained by account management module 220 includes, but is not limited to, one or more account identifiers, log-in names or other values required to access and retrieve contact data from a given source of contact data (though it is contemplated that some sources of contact data may be publicly accessible and thus do not require authentication). Such account management data can also include any other prescribed information pertaining to how or when to access a source of contact data (for example, whether to access a source of contact data at a specified time, periodically, or when the source is explicitly accessed in some other context). The account management module 220 can access contact data sources based on the stored data described above. Account management module 220 can maintain the above-described account management data for each client device 132 associated with computing device 104. Account management data, along with all other monitoring and notification-related configurable settings, can be managed from computing device 104 (e.g. by way of terminal 128) or client device 132 (e.g. via a web browser interface). Account management module 220 can also acquire and manage data pertaining to any prescribed preferences associated with contact agent client 168 as well as preferences used by other modules in logic layer 216.

Contact mapping module 224 determines geographic coordinates associated with a given contact record and transmits such coordinates to client device 132 for use at client device 132, for example by a web-based or local mapping application (e.g. Google Maps or Bing Maps) based on a given prescribed location (e.g. greater San Francisco area, postal code, province/state, country) or the present location of the client device 132. Location information can be derived and supplied to client device 132 via a number of means including, but not limited to, being explicitly provided or set by a given contact or being autonomously determined by a variety of means such as reverse geocoding IP addresses or methods used by cellular networks to triangulate devices. Contact mapping module can select contacts for which to obtain and =transmit location data to client device 132 based on contact attributes, such as professional or personal affiliations (e.g. 'Optical Networking' or 'Scotch Tasting') as well as contextual attributes ('interested in meeting for dinner').

Matching module 228 parses, filters, and indexes retrieved contact data retrieved from, for example, servers 156. Parsing includes lexical and syntactic analysis of retrieved contact data in order to derive objects or tokens (also referred to herein as "attributes") such as name, location, telephone number, state (e.g. available, busy, in transit, attending conference etc.), intent (e.g. travelling to Los Angeles in two weeks) and the like. Matching module 228 includes a filtering function which is configured to discard contact data that is deemed to be irrelevant, to merge duplicate contact data, or any suitable combination of such functions. The filtering function can be set to discard contact data that does not relate to a particular selection of attributes.

In other embodiments, the filtering function can be set to discard contact data that does relate to a particular selection of attributes. Such selections can be altered via input data received from terminal 128 or client device 132. Such selections can also be altered automatically at computing device 104, based on chronological, spatial, or contextual information.

Matching module 228 also includes an indexing function configured to identify portions of retrieved contact data deemed to be of particular interest based on certain attributes. Portions of contact data identified as being relevant to certain attributes can be processed and stored as analyzed data, and can include, for example, data describing events or other attributes. The attributes which are used to determine whether the portions of contact data are of interest can be explicitly set via terminal 128 or client device 132, and can include, for example, attributes such as professional affiliation, location and the like. Such attributes can also be determined automatically by matching module 228, for example by the relative frequency with which they are derived from retrieved contact data (e.g. an increased instance of contact data pertaining to the attribute "venture capital" can lead to retaining portions of retrieved contact data relevant to that attribute). A combination of explicitly set attributes and automatic determination can also be used. It is contemplated that a variety of algorithms (e.g. expert systems, neural net based systems, inference engines) and data structures can be used to implement the above-mentioned functions of matching module 228. It is also contemplated that multiple parsing, filtering, identification and indexing methods can be used in parallel or as a function of the source of the contact data.

Pattern discovery module 232 correlates analyzed contact data to infer potential items of interest based on relative frequency over a given chronological period (i.e. the frequency with which a particular attribute appears in analyzed contact data), threshold events, or based on explicitly prescribed attributes. It is contemplated that a variety of available algorithms can be used to implement pattern recognition functionality. It is also contemplated that multiple pattern recognition methods can be used in parallel or as a function of the source of the contact data.

Keyword analysis module 236 selects analyzed contact data as being of interest, based on specific keywords (e.g. "Information Technology") by invoking the functionality of matching module 228 and pattern discovery module 232. The keywords can be explicitly prescribed via the account management module 220 or automatically determined based on the relative frequency with which they appear in contact data gathered from servers 156 and client device 132 over a given chronological period or other threshold events. Keyword analysis module 236 can optionally synthesize a summary of relevant portions of analyzed contact data which can be pushed or otherwise provided to client device 132 for display on display 148, or to any other designated location (e.g. a messaging system or e-mail address) or retrieved upon request, as will be discussed below in connection with the performance of block 340 of method 300.

The proximity detection module 240 determines the relative geographic location of contacts of interest. Contacts of interest can be explicitly prescribed via the account management module 220 by selection of attributes describing those contacts (e.g. names such as "John Smith" and professional affiliations such as "Cisco" or "Professional Engineers of Ontario"), and other attributes qualifying those contacts (e.g. an attribute indicating that the status of the contact is "available"). Contacts of interest can also be determined as described below in connection with the method of FIG. 3. Proximity detection module 240 can optionally invoke contact mapping module 224 to retrieve geographical information. The geography of interest can be set by the account management module 220 and can, include geo-political boundaries (e.g. state, country) or simple geometric search criteria (e.g. within 10 kilometers).

The search module 244 selects analyzed contact data as being of interest based on various keywords (e.g. "marketing") by invoking matching module 228 and pattern discovery module 232. Search module 244 can synthesize a summary of selected analyzed contact data deemed to be relevant. The summary can be pushed or otherwise provided to client device 132 or another designated location, as described above in relation to keyword analysis module 236. While keyword analysis module 236 selects analyzed data based on keywords either explicitly prescribed or received in contact data from particular sources (for example, servers 156 and client device 132), search module 244 can select analyzed contact data of interest based on keywords from a wider selection of unregistered sources. Search module 244 can be configured substantially as a web crawler, for example. The operation of search module 244 is configurable, and operational parameters for search module 244 can be maintained by, and updated via, account management module 220. Configurable operational parameters for search module 244 can include, for example, periods of activity (e.g. constant operation, operation during certain hours only and the like), target selection (e.g. exclude certain potential sources such as web domains, include only sources in certain categories), acceptable network conditions (e.g. operate only when certain quality-of-service parameters can be satisfied) and the like.

Although the above-mentioned modules are described individually, it is contemplated that the functionality of any given selection of modules, or of all modules, can be combined within logic layer 216.

Contact agent host 172 also includes an API layer 248. API layer 248 enables interaction between the data and logic layers 200 and 216, and a presentation layer 252 of contact agent host 172. Although not shown in FIG. 2, API layer 248 also enables interaction between data layer 200 and the data sources, discussed above. Presentation layer 252 can include various modules for interacting with client device 132. For example, presentation layer 252 can include a website module 256 (for example, hosted by computing device 104) for enabling interactions with browser application 164 of client device 132. API layer 248 also enables applications maintained at client device 132 to make API calls directly to computing device 104. In particular, contact agent client 168 is depicted schematically in FIG. 2. Contact agent client 168 can include any suitable combination of a browser plugin 260, a mobile application 264 (where client device 132 is, for example, a mobile phone), an email plugin 268 integrated with an email client application and a desktop application 272 (where client device 132 is a personal computer or laptop computer). The various modules of contact agent client 168 can interact with computing device 104 via API layer 248.

Figure 3:
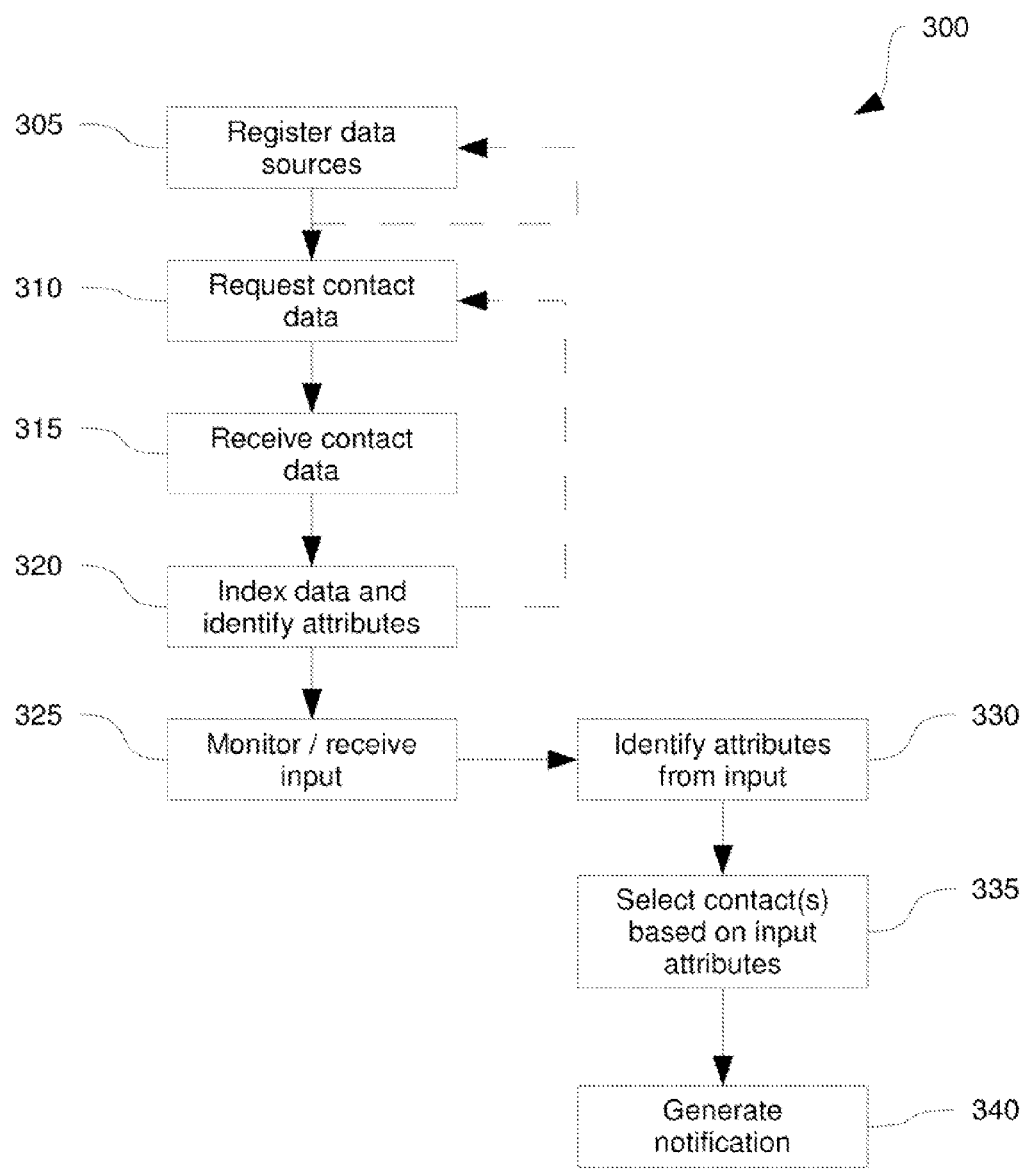
FIG. 3 depicts a method of managing contact data, according to a non-limiting embodiment.

Referring now to FIG. 3, a method 300 of managing and augmenting contact data will be described in conjunction with its performance in system 100. It will be appreciated, however, that method 300 need not be performed exactly as discussed herein, and can be performed on systems other than system 100.

Beginning at block 305, processor 108 can be configured, via execution of contact agent host 172 and in particular account management module 220 of contact agent host 172, to register one or more data sources. Data sources can include the services or applications hosted by servers 156, as well as sources local to client device 132 such as an address book maintained in memory 138. In some embodiments, computing device 104 can maintain copies of client data (e.g. address books) for backup purposes as well as for ready access during performance of method 300. Data source registration can include receiving input data from client device 132 or terminal 128 defining various parameters for each data source. For example, where a data source implements authentication, block 305 can include the receipt of login identification and a password or any other required authentication information. Other data can also be maintained for each registered data source, such as a network address for the data source, an identification of the necessary API call required to request data from that source, or any suitable combination of the above. Each registered data source can be maintained as a record in a data sources database (not shown) stored in memory 112. It will be appreciated that some or all of the data collected during the performance of block 305 can be encrypted.

As indicated by the dashed arrow returning to block 305, performance of block 305 can be repeated as necessary until all the desired data sources have been registered. It will be appreciated that block 305 can also be performed at any other time during the performance of method 300. Performance of block 305 can be initiated at any time by receipt of input data indicating selection of a "add data source" command in a GUI provided by terminal 128. In some embodiments, performance of block 305 can be initiated by receipt of an API call at computing device 104 from client device 132. Such an API call can be generated by client device 132 responsive to selection of a command in a GUI provided on display 148.

Proceeding to block 310, processor 108 can be configured to request contact data from at least one of the registered data sources. In some embodiments, processor 108 can be configured to request data from every data source. Performance of block 310 includes the transmission of a request, via communications interface 116 and network 124, to each server 156 which has been registered as a data source. For data sources maintained by computing device 104 itself, performance of block 310 can also include transmission of a request to, for example, another application (that is, other than contact agent host 172) resident on computing device 104 including, but not limited to, social networking applications, instant messaging applications, or e-mail applications in addition to single execution source applications such as on-demand content management systems. For data sources maintained by client device 132, performance of block 310 can include transmission of a request to client device 132 via network 124.

Method 300 continues at block 315, at which contact data is received, responsive to the requests transmitted at block 310. Block 315 can therefore include the receipt of data from servers 156, client device 132 and any local data sources as applicable. Contact data received at block 315 can be maintained in memory 112 in a data store 176, shown in FIG. 1. Contact data can also be "received" at block 315 from a different data store within memory 112 similar to data store 176 but associated with a different client device 132. In other words, computing device 104 can perform method 300 for a plurality of client devices 132, and in some embodiments can use contact data gathered for one client device in an analysis performed for another client device.

It is also contemplated that in some embodiments, contact data can be received by computing device 104 at block 315 without having transmitted a request for that contact data (i.e. "unsolicited" contact data). Transmission of such unsolicited contact data can originate at client device 132 and can be initiated, for example, by receipt of input data from input device 144 at processor 136. More specifically, as mentioned above, client device 132 can maintain, in memory 138 for execution by processor 136, contact agent client 168. Processor 136 can be configured, via execution of contact agent client 168, to control display 148 to generate a representation of a GUI, also referred to herein as an interface, including selectable commands. An example of such an interface 400 is shown in FIG. 4.

Figure 4:
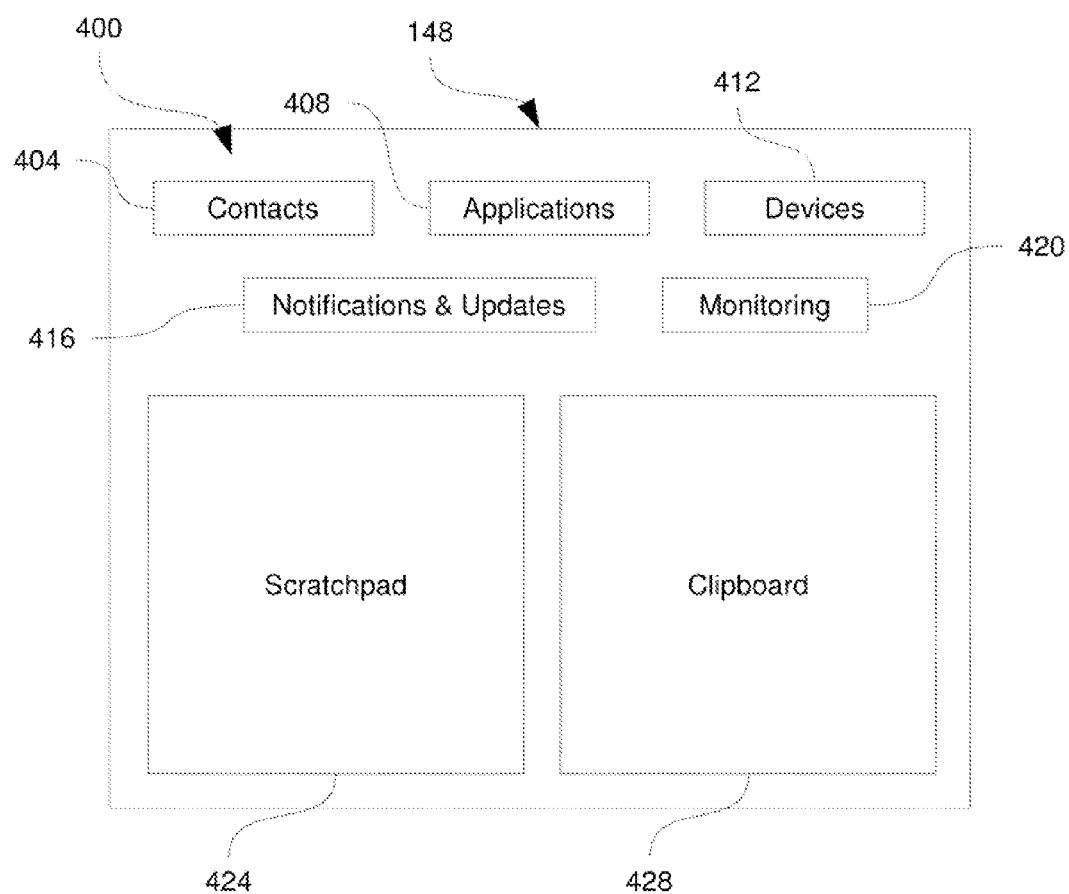
FIG. 4 depicts a graphical user interface generated by the contact agent of FIG. 2, according to a non-limiting embodiment.

FIG. 4 depicts interface 400 rendered on display 148 under the control of processor 108. Interface 400 can include a variety of representations of selectable commands. Shown in FIG. 4 are a "Contacts" command 404, an "Applications" command 408, a "Devices" command 412, a "Notifications & Updates" command 416 and a "Monitoring" command 420. The various commands of interface 400 are selectable via input received at input device 144. Also included in interface 400 are a scratchpad 424 and a clipboard 428, which will be described in greater detail below.

Contact data can be provided to processor 136 via input device 144 by selection of scratchpad 424, followed by data entry. Such data can take a variety of forms. For example, data can be copied and pasted from a document into scratchpad 424. Input data received at processor 136 in connection with scratchpad 424 can be transmitted to computing device 104 for receipt at block 315. Such transmission can be initiated by selection of a "transmit" command (not shown) at client device 132. In other non-limiting embodiments, such transmission can be carried out automatically at configurable intervals.

Once contact data has been received at block 315, method 300 proceeds to block 320, at which processor 108 can be configured to begin analysis of the aggregated contact data maintained in data store 176. The analysis can be performed by processor 108 via execution of the various modules of contact agent host 172, including at least matching module 228. In other words, matching module 228 distills attributes and other analyzed data from the "raw" contact data received at block 315. Performance of block 320 includes indexing the received contact data in data store 176. The indexed contact data is then traversed and attributes are identified from the indexed contact data. A wide variety of attributes can be identified, in various categories. Attributes can describe a contact (e.g. the name and address of an individual, birth date, gender and the like). Other attributes can describe geographic data such as the location of a contact's employer and the like.

Attributes can also generally illustrate the context with which a contact is associated. For example, processor 108 can distill the name of a contact, and the received contact data can indicate that the contact publishes articles in information technology ("IT"). Processor 108 can thus select the attribute "IT" for association with the name attribute of that contact. It will now be apparent that a wide variety of attributes can be ascertained from the contact data in data store 176. Such attributes can also be associated with one another. For example, a name attribute and a location attribute can be associated when they were derived from the same portion of contact data received at block 315. It is not necessary for contextual or geographical attributes to be associated solely with name attributes, however. For example, some attributes which describe context (such as "IT" above) can be associated with other attributes which frequently appear in similar contexts (such as "hardware", for example).

Performance of block 320 also includes the selection of portions of contact data (such as data describing an event) for storage along with the identified attributes.

Processor 108 can also, as part of the performance of block 320, assign a weighting factor to one or more of the attributes distilled from data store 176 for each contact. Weighting factors can be assigned to indicate the relative importance of each attribute. For example, the above-mentioned contact who publishes IT articles could also maintain a gardening website which is identified in the received contact data. Assume that the IT articles were significantly more prevalent (that is, the articles or mentions thereof appeared more frequently in data store 176) than the gardening-related writings, the "IT" attribute could be assigned a higher weighting than a "gardening" attribute. Weighting factors can also be specified or modified explicitly based on contextual or other attributes. For example, weights associated with specific geographic attributes identifying locations such as "Cancun" can be more, strongly weighted towards recreational attributes such as "scuba". Those skilled in the art will recognize that weighting factors can be assigned and modified via a variety of methods and algorithms in the art including methods associated with neural networking, expert systems, and inference engines as well as methods and algorithms practiced in information theory and computer science based on algebraic operations based on relative frequency, "distance" (e.g. word separation), and explicitly defined importance.

Performance of block 320 can also include storing and indexing the results of the analysis (i.e. attributes) in memory 112. As will now be apparent to those skilled in the art, any suitable indexing scheme can be used to facilitate searching and access of the attributes and other analyzed data, and to indicate associations therebetween. In general, analyzed data (including attributes) distilled from data store 176 as a result of the performance of block 320 can be maintained in memory 112 in a processed data store 180. Following completion of block 320, data store 176 can be cleared, though this is not a necessity: in some embodiments some or all of the contents of data store 176 can be retained for archiving purposes or to allow for further processing, either at a later time or simultaneously with the remainder of the performance of method 300, as a background process.

Following completion of the performance of block 320, method 300 advances to block 325. It is contemplated that, as shown by the dashed arrow returning from block 320 to block 310, the data gathering and analysis embodied by the performance of blocks 310-320 can be repeated at any time, independently of the remainder of method 300. In some embodiments, performance of blocks 310-320 can be initiated automatically by contact agent host 172. Such automatic initiation can be based on a predefined time period. In other non-limiting embodiments, automatic initiation could instead be based on network conditions. That is, processor 108 could be configured to initiate retrieval and analysis of data only when certain cost, bandwidth or other network parameters are satisfied. In still other non-limiting embodiments, initiation of the performance of blocks 310-320 can be manual, via input received at terminal 128.

Returning to FIG. 3, at block 325 processor 108 can be configured to monitor activities on client device 132 and terminal 128. In particular, processor 108 can be configured, via execution of contact agent host 172, to monitor input data received at terminal 128, and to monitor various activities at client device 132, as discussed in greater detail below.

Performance of block 325 can also include requesting and gathering data (considered to be "input" in the context of block 325) from unregistered, sources by search module 244. It is also contemplated that data received from registered sources such as servers 156 can be considered input at block 325. Further, data collected in connection with other client devices 132 can also be considered as input at block 325. In general, the performance of method 300 can be continuous, and thus contact data received for analysis can also be treated as input and processed in light of previously stored analyzed data.

It is contemplated that in some embodiments, processor 136 of client device 132 is configured, via execution of contact agent client 168, to carry out local monitoring and to transmit the results of such local monitoring to computing device 104. Thus, in performing block 325; processor 108 of computing device 104 monitors for (i.e. waits for receipt of) local monitoring results from client device 132.

Referring to FIG. 4, local monitoring at client device 132 can be configured via selection of the Monitoring command 420 by way of input device 144. Local monitoring and transmission of results can be conducted at any suitable time interval, and the level of detail of such local monitoring can also be configured. In some embodiments, it may be desirable to minimize the impact of contact agent client 168 on the performance of client device 132, and thus the time interval and detail settings can be changed to reduce the frequency of monitoring and the volume of monitored data that is collected for transmission to computing device 104. In other embodiments, due to the requirements for increased data quality, the increased capabilities of client device 132 or both, performance impact may be of lesser concern, and thus the frequency and detail level of monitoring can be increased. Those skilled in the art will recognise that the local monitoring can be configured to execute as a background process on client device 132—and configured to change state to a foreground process upon an explicit command or upon the detection of a given event.

As part of the local monitoring, contact agent client 168 can be configured to monitor any of a variety of applications executing on client device 132, such as web browser 164, a word processing application, a messaging application such as an email client, and the like. In some embodiments, local monitoring includes the recording of input data received from input device 144 and of representations 152 generated by display 148 for transmission to computing device 104. That is, in such embodiments client device 132 simply collects raw data in the form of input data and screen captures of display 148 and transmits the collected data to computing device 104 for analysis.

In other embodiments, client device 132 can perform varying degrees of data pre-processing prior to transmitting data to computing device 104. In these embodiments, processor 136 can be configured to distill a smaller number of keywords from input data received from input device 144 (it is contemplated that when no pre-processing is conducted, all items of data are considered keywords for transmission to computing device 104). For example, processor 136 can be configured to monitor a word processing application and discard prepositions, punctuation marks, pronouns and the like received as input data. The remaining words received as input data can be considered keywords and transmitted to computing device 104. Processor 136 can also be configured, rather than transmitting screen captures of display 148, to distill keywords for transmission, while discarding other portions of the screen captures. It is contemplated that "keywords" in the context of screen captures, also includes image data. Thus, processor 136 can be configured to transmit a photograph and associated caption displayed on display 148, but not a background image or "wallpaper", which can be considered to be of lesser or negligible importance.

Input data can be received specifying which applications are to be monitored, at what frequency, and at what level of detail (including the level of pre-processing to be carried out), in an interface (not shown) generated upon selection of the Applications command 408 in interface 400. Such settings can then be maintained in memory 138. Interactions (monitoring and otherwise, as will be discussed below in greater detail) with the various applications can be managed by processor 108 executing contact agent 156, and in particular, the plugins such as 256 and 260 of presentation layer 252. Contact agent 156 can autonomously derive and infer attributes and relationships pertaining to contact information via the matching module 228, pattern matching module 232, and other modules of the logic layer 116.

In addition to the local monitoring mentioned above, local monitoring also includes monitoring input data received at processor 136 from input device 144 in connection with contact agent client 168 itself. In particular, as mentioned earlier the scratchpad element 424 of interface 400 can be used to "drag and drop" or otherwise enter search terms or other data. It will now be apparent, therefore, that input received at block 325 can itself be considered contact data for analysis, indexing and storage in processed data store 180. Those skilled in the art will recognize that search terms or data can include text (including names, locations, professions, uniform resource locators etc.), images, documents, sound/video files or other data objects which can be parsed and analyzed by the logic layer 216. Input data received in connection with scratchpad 424 can be transmitted directly to computing device 104, or can be pre-processed as discussed above prior to transmission.

Having received input in the form of monitoring results from client device 132, input data from terminal 128 and the like, processor 108 can be configured, at block 330, to identify attributes from that input. The identification of attributes can be performed in substantially the same way as at block 320, and the identified attributes can be maintained in memory 112, either temporarily (that is, until the current performance of method 300 is complete) or for a longer period of time.

Proceeding to block 335; processor 108 can be configured to select contacts (for instance, by selecting name attributes from processed data store 180) based on matches between the attributes associated with those contacts and the attributes detected or autonomously derived or inferred at block 330. For example, if the "gardening" attribute is identified or otherwise derived at block 330, then at block 335 a certain configurable number of best matched name attributes can be selected. Best matched contacts can be those with the highest-weighted "gardening" attribute association. Best matched contacts can also be, in some embodiments, those with the highest-weighted "gardening" attribute as well as other attributes matching at least some attributes of a user profile 184 maintained in memory 112. User profile 184 is associated with client device 132 and can contain data (geographical, keywords and the like) relating to a user associated with client device 132. User profile can also include data relating to registered data sources, actions carried out at client device 132 in response to notifications (which will be discussed shortly) and the like.

It is contemplated that the performance of blocks 330 and 335 can be performed by at least keyword analysis module 236 and search module 244, in conjunction with matching module 228.

Once relevant contacts have been selected at block 335, method 300 proceeds to block 340, at which processor 108 can be configured to generate a notification at client device 132 based on the context in which client device 132 is being used and on the selected contacts. Generation of a notification includes the transmission of notification data from computing device 104, via interface 116 and network 124; to client device 132 for handling by processor 136. In some non-limiting embodiments, notifications can be generated as representations on display 148. In certain non-limiting ones of such embodiments, the representations can be displayed in the clipboard element 428 of interface 400. In some embodiments, recommendations can also be displayed within other applications (for example, within browser application 164) via plugins included in contact agent client 168 (examples of which are shown in FIG. 2).

To better illustrate the performance of method 300, and in particular of block 340, an exemplary performance will be discussed below.

Alice meets Bob at an event, and discovers that Bob's employer specializes in securing funding for non-profit organizations. Upon return from the event, Alice sends, from her client device 132, an email to Bob via a web-based email application such as Gmail™. Processor 108, performing method 300, transmits periodic requests to the server 156 which maintains Alice's Gmail™ account and thereby obtains data (blocks 310 and 315) relating to the email. Upon performance of block 320, attributes are stored in processed data store 180 for Bob (including a name and an email address, for instance). Additionally, Alice manually enters the keywords "non-profit", "research" and "funding" in a contact record for Bob maintained in memory 138. Computing device 104 therefore also receives the above-mentioned terms as contact data at the same or a subsequent performance of block 315. Computing device 104 identifies "funding" as an attribute and associates it with Bob's name attribute, along with a weighting factor. It is contemplated that Alice can also enter attributes directly into processed data store 180, thus bypassing block 320, by selection of the "Contacts" command 404 in GUI 400.

At a later time, Alice receives an email from another contact which mentions the keyword "fundraiser". Processor 136, executing contact agent client 164, monitors the email application through which Alice is reading the email, identifies the "fundraiser" keyword therein and transmits the keyword to computing device 104, which receives the keyword as part of the performance of block 325. Processor 108 (via execution of at least keyword analysis module 236), at block 330, identifies the keyword "fundraiser" as corresponding to the attribute "funding". Proceeding to block 335, processor 108 then determines that Bob's name attribute is associated with the attribute "funding" and selects Bob's name attribute as potential analyzed contact data of interest. Proceeding to block 340, processor 108 transmits notification data to client device 132 which results in the control of display 148 by processor 136 to produce an interface as shown in FIG. 5.

Figure 5:
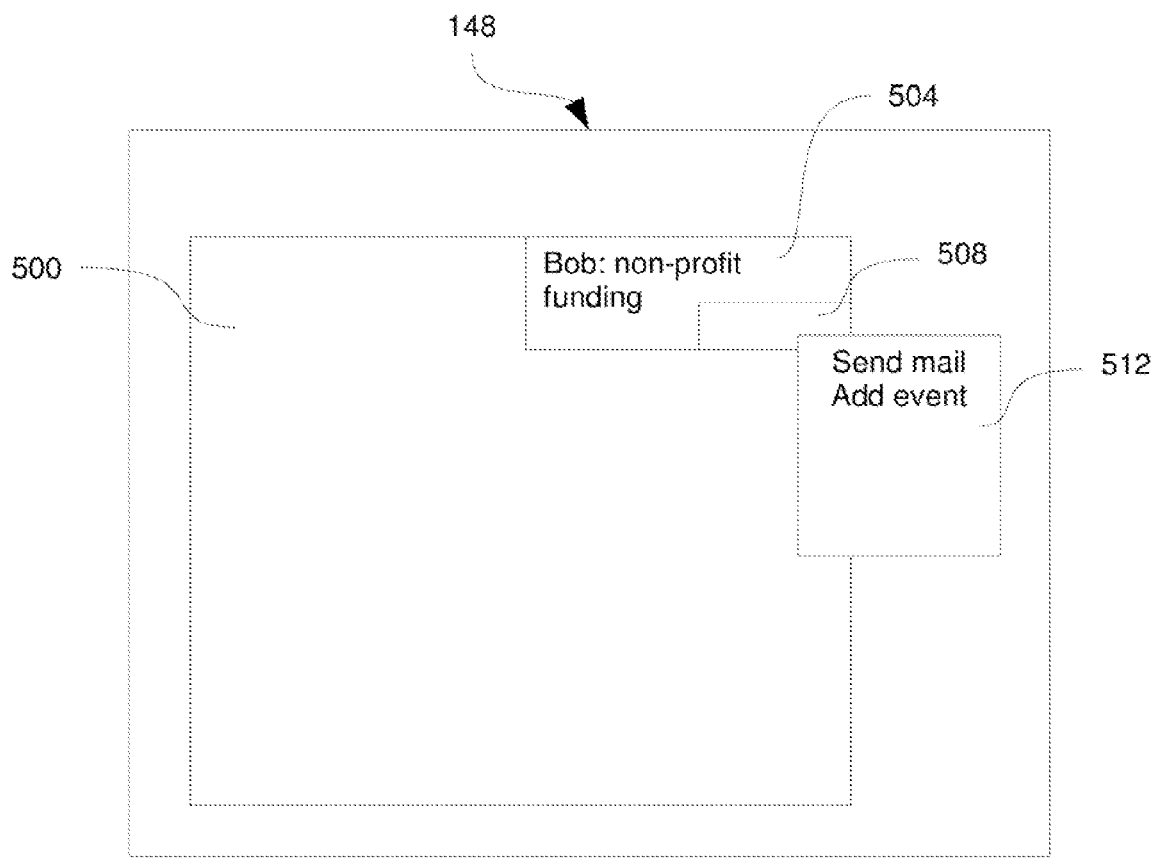
FIG. 5 depicts a further graphical user interface generated by the contact agent of FIG. 2, according to a non-limiting embodiment.

FIG. 5 shows a representation 500 of browser application 164, as in this exemplary performance of method 300 the email Alice is reading is accessible via a web-based interface. Also generated on display 148 is a notification bar 504. Notification bar 504 can be generated within browser representation 500 via interaction between browser plugin 260 of contact agent client 168 and browser application 164. Notification bar 504 can include an indication of the contact selected at block 335 as well as other relevant attributes pertaining to the contact, as seen in FIG. 5. Notification bar 504 can also include an action element 508 associated with notification bar 504. Action element 508 can recommend one or more actions, such as sending Bob an email and/or scheduling a meeting with Bob ("Add event"). Therefore, selection of action element 508 can result in the generation of a secondary action element 512 which includes the recommended actions and a field for entering text for the email and/or event. It is contemplated that notifications can also be generated in other applications than those whose monitoring lead to the notifications.

It is contemplated that notifications generated at block 340 need not necessarily be generated as described above. Notifications can also be generated in audible format, for example. In other embodiments, notifications can be provided from computing device 104 to the user of client device 132 via email, social networking application messages (also commonly referred to as 'in-app'), Short Message Service ("SMS") or Multimedia Message Service ("MMS") messages and the like. The nature and frequency of notifications generated can be configured from within contact agent client 164 by selection of the Notifications & Updates command 416 shown in FIG. 4. Such settings, once accepted, are transmitted to computing device 104 for storage and consultation at block 340. Additionally, notifications can be dependent on notification profiles used, for example, in smartphones. In such embodiments, processor 136 can be configured via execution of contact agent client 164 to detect an active profile (e.g. "Busy", "Silent" and the like) on computing device 132 and modify notifications accordingly.

In some embodiments, one or both of mapping module 224 and proximity detection module 240 can also be invoked during the generation of notification data. The notification data transmitted at block 340 can therefore include data allowing client device to display the selected contact or contacts on a map shown on display 148.

Notifications generated at block 340 can also be displayed in clipboard 428 at client device 132, even when the notification settings of contact agent client 164 prevent them from being displayed in other areas. That is, processor 132 can be configured to generate clipboard 428 on display 148 as an unfiltered stream of notifications, only a portion of which are also provided elsewhere on client device 132. As such, processor 108 can additionally generate notifications for display by client device 132 in clipboard 428 without the execution of blocks 325 and 330 as discussed above. To that end, processor 108 can be configured to select one or more contacts automatically based simply on user profile 184, without any other monitoring or receipt of input data. Thus, execution of contact agent host 172 can cause processor 108 to determine relationships between user profile 184 and other contacts autonomously based on the attributes in user profile 184 and those in processed data store 180, and to rank those relationships based on attribute matches and weighting. The "unsolicited" notifications resulting from this type of selection can be displayed in clipboard 428 for later review, though in some embodiments such notifications can also be provided as notification bars as discussed in connection with FIG. 5.

Figure 6:
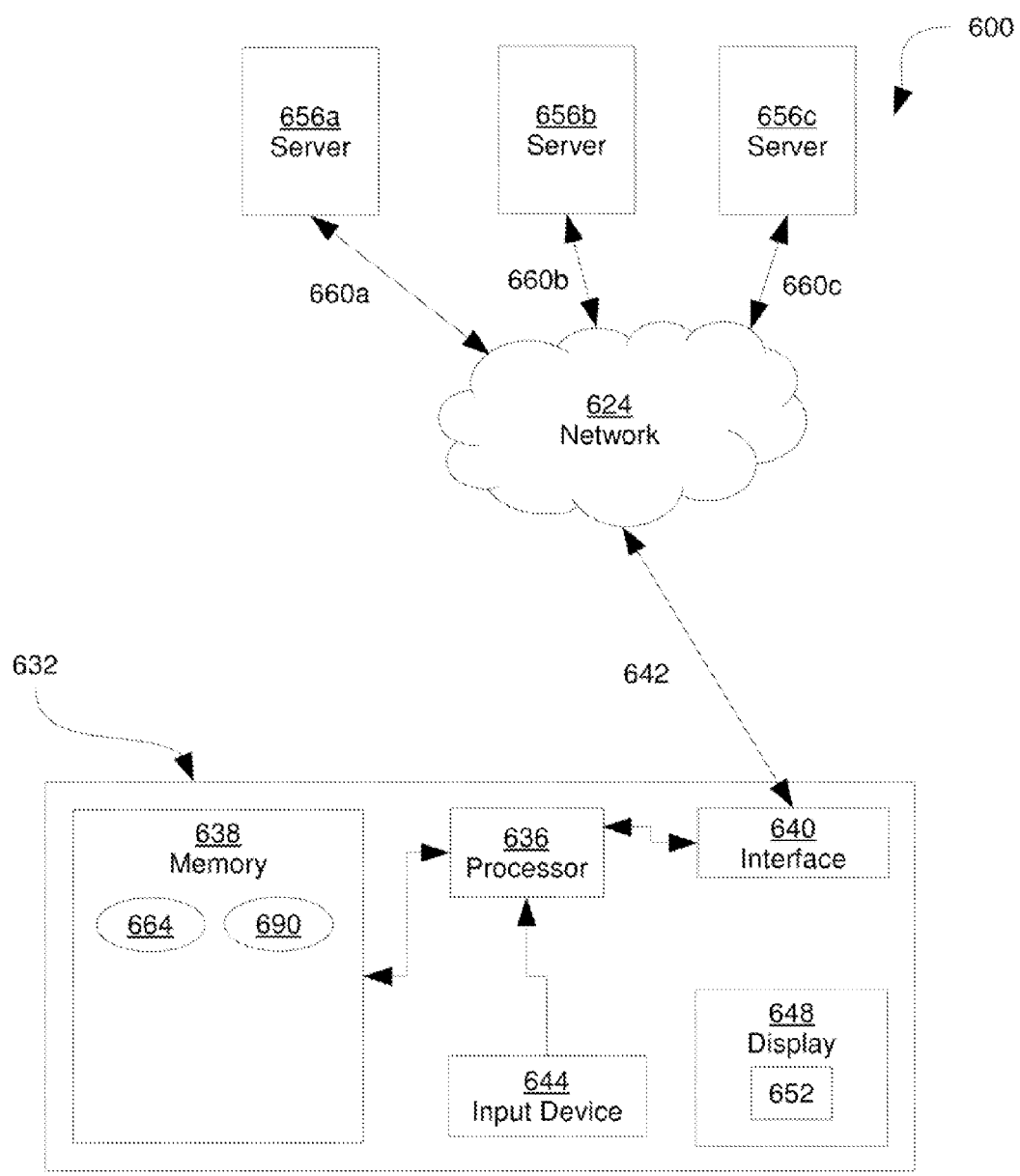
FIG. 6 depicts a system for managing contact data, according to another non-limiting embodiment.

Referring, now to FIG. 6, a system 600 is depicted according to another non-limiting embodiment. Where components of system 600 are similar to those of system 100, they are similarly numbered with the exception of a leading "6" being used rather than a leading "1". Thus, system 600 includes a client device 632 with internal components (not shown) as discussed in relation to FIG. 1. System 600 also includes servers 656*a*, 656*b*, 656*c* and so on connected with client device 632 via links 660*a*, 660*b*, 660*c* and network 624 (to which client device 632 is connected via link 642). Of note in system 600 is that client device 632 is the only computing device shown. In system 600, client device 632 can be a personal computer, mobile electronic device and the like which is configured to provide the functionality of both the client and host applications discussed above. Client device 632 thus includes, in memory 638, a contact agent application 690 in addition to web browser application 664. Contact agent application configures processor 636 for carrying out all the functionality of both the host and client applications described above. That is, processor 636, via execution of contact agent application 690, is configured to obtain contact data from sources such as servers 656, and to aggregate and index that data. Processor 636 is further configured to monitor activities local to client device 632 (such as input received at input device and actions invoked by web browser application 664 or other applications, not shown) and to select contacts and generate notifications based on the selections.

Those skilled in the art will appreciate that in some embodiments, the functionality of contact agent client 168 and contact agent host 172 can be implemented using pre-programmed hardware or firmware elements (e.g., application specific integrated circuits (ASICs), electrically erasable programmable read-only memories (EEPROMs), etc.), or other related components.

In some embodiments, the resources (e.g. memory and processor) and functionality of computing device 104 may be partially or entirely distributed via one or more computing devices or servers in a construct known as a 'cloud' or 'cloud computing' as generally described by Wikipedia at http://en.wikipedia.org/wiki/Cloud_computing. For example, with reference to method 300, processor 108 and memory 112 can be distributed among several computing devices and servers with processing of method 300 being coordinated by methods and algorithms well known by those skilled in the art.

It is also contemplated that in some embodiments, that servers 156 and associated applications may be provided via cloud computing methods and practices. Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of managing contact data, the method comprising:
   storing in a memory of a computing device, a network address and authentication data for at least one data source;
   receiving a set of keywords independently of any contact data, and storing the set of keywords in the memory;
   automatically transmitting a request for contact data from the computing device to the at least one data source at a server associated with the network address, the request including the authentication data;
   receiving the contact data from the server in response to the request and storing the contact data in the memory;
   distilling a plurality of contact attributes from the contact data received from the at least one data source, and storing the contact attributes in the memory, the contact attributes including a plurality of names and a plurality of additional attributes associated with the names, wherein distilling the additional attributes comprises detecting matches between the contact data and the set of keywords;
   after receiving the contact data and distilling the contact attributes, receiving, from a client device, input data at a communications interface of the computing device;
   identifying at least one common attribute from the received input data by determining that the at least one common attribute matches one of the keywords in the set of keywords;
   selecting at least one of the plurality of contact attributes that matches the at least one common attribute; and
   transmitting notification data to the client device based on the selected contact attribute.

2. The method of claim 1, further comprising:
   after distilling the plurality of contact attributes, deleting the received contact data.

3. The method of claim 1, wherein the input data comprises at least one of the keywords in the set of keywords, and wherein the at least one common attribute is the at least one keyword in the set of keywords.

4. The method of claim 1, wherein transmitting notification data comprises transmitting the selected contact attribute.

5. The method of claim 4, wherein the transmitted contact attribute is a name attribute.

6. The method of claim 1, wherein the input data is gathered by the client device via monitoring of at least one application being executed on the client device.

7. The method of claim 1, further comprising:
   after receiving the contact data and distilling the contact attributes, detecting a match between at least one contact attribute and one of the keywords in the set of keywords; and
   transmitting additional notification data based on the at least one contact attribute.

8. The method of claim 7, wherein transmitting the notification data comprises:
   generating a notification bar in an application window from which the input data was received.

9. The method of claim 8, wherein transmitting the notification data further comprises:
   generating a listing identifying the selected contact attribute in a clipboard application separate from the application window.

10. The method of claim 9, wherein transmitting the additional notification data comprises:
    generating an additional listing identifying the additional contact attribute in the clipboard application.

11. The method of claim 8, wherein the notification bar is generated via a plugin for the application window.

12. An apparatus, comprising:
    a communications interface; and
    a processor configured to perform the method of claim 1.

13. A non-transitory computer-readable medium for storing computer-readable instructions executable by a processor, the computer-readable instructions implementing the method of claim 1.

* * * * *